United States Patent [19]

Paris, Jr. et al.

[11] 4,175,458
[45] Nov. 27, 1979

[54] CUT-OFF SAW

[75] Inventors: Alfonso A. Paris, Jr.; Douglas W. Muscanell, both of South Hill, Va.

[73] Assignee: New England Log Homes, Inc., Hamden, Conn.

[21] Appl. No.: 895,925

[22] Filed: Apr. 13, 1978

[51] Int. Cl.² .................. B27B 5/18; B27B 27/00
[52] U.S. Cl. ........................ 83/268; 83/210; 83/371; 83/467 A; 83/391; 83/282
[58] Field of Search ............ 83/268, 269, 255, 282, 83/371, 71, 467 R, 467 A, 468, 391

[56] References Cited

U.S. PATENT DOCUMENTS

| Re. 25,686 | 11/1964 | Sherman | 83/371 X |
|---|---|---|---|
| 3,063,479 | 11/1962 | Prentice | 83/210 |
| 3,141,367 | 7/1964 | Keener et al. | 83/467 A |
| 3,370,494 | 2/1968 | Schenck | 83/467 R X |
| 3,813,980 | 6/1974 | Rand et al. | 83/391 X |
| 3,910,142 | 10/1975 | Jureit et al. | 83/268 X |
| 4,011,779 | 3/1977 | Berg | 83/268 X |

Primary Examiner—Donald R. Schran
Attorney, Agent, or Firm—DeLio and Montgomery

[57] ABSTRACT

A cut-off saw assembly for building logs wherein each log is positively advanced to a stop area comprising an array of power actuated stops at varying distances from a cut-off saw, the saw being actuated after the log has been stopped and clamped firmly to a table through which the saw blade is advanced and retracted.

5 Claims, 4 Drawing Figures

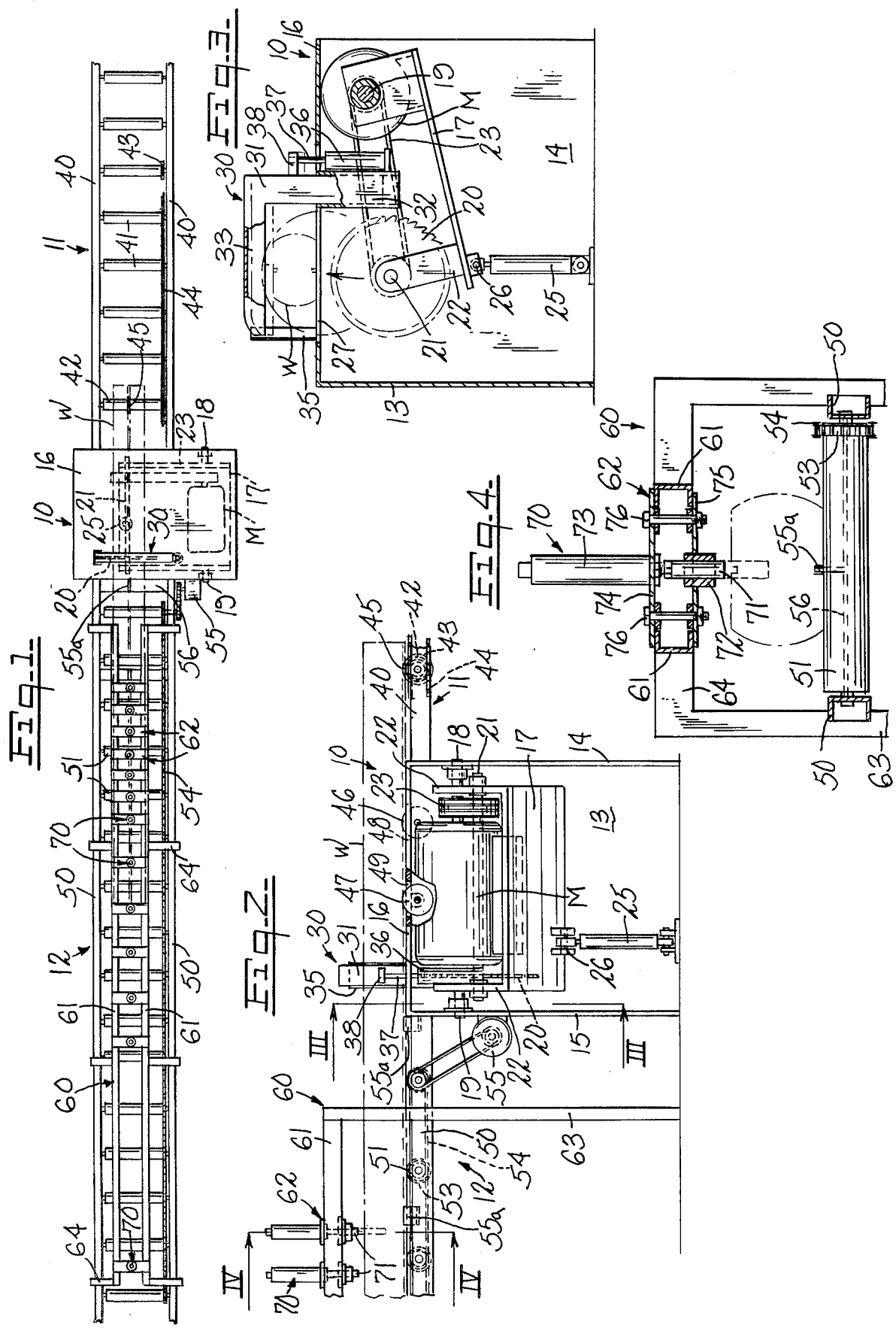

CUT-OFF SAW

This invention relates to a cut-off saw assembly for use in cutting logs to predetermined lengths, as required particularly in the manufacture of components for log homes or other buildings wherein logs are used instead of planks or other finished lumber.

In the construction of log homes and the like it is customary to use logs of standard dimensions, as far as possible, so that precutting of the logs can be effected accurately and efficiently in a mill before the components are shipped to the building site. Even with some standardization it is still necessary to provide logs of several different lengths, from two or three feet up to sixteen or eighteen feet. Individual measurement of such logs with a tape is a time-consuming operation, but has been resorted to, of necessity, prior to the development of the present invention.

It is an object of the present invention to provide means for cutting accurately, to predetermined selected lengths, a series of logs, each preferably having at least one flat side traversed by a longitudinal groove.

It is a further object of the invention to provide means for feeding each log to the cutting area rapidly and with a minimum of manual effort.

It is another object of the invention to provide stop means in a cutting machine which means are moved into stop position selectively, as required, by pneumatic, hydraulic or electric means.

It is a still further object of the invention to provide accurate guidance of the log in all positions, together with means for clamping the log firmly on a support during the cutting operation.

It is yet another object of the invention to provide certain improvements in the form, construction and arrangement of the several parts whereby the above-named and other objects may effectively be attained.

The invention accordingly comprises the features of construction, combinations of elements, and arrangement of parts which will be exemplified in the constructions hereinafter set forth, and the scope of the invention will be indicated in the claims.

A practical embodiment of the invention is shown in the accompanying drawings wherein:

FIG. 1 represents a top plan view of the machine;

FIG. 2 represents a side elevation of the middle portion of the machine, parts of the feed table and delivery table being broken away;

FIG. 3 represents a vertical section on the line III—III of FIG. 2; and

FIG. 4 represents a vertical section on the line IV—IV of FIG. 2.

Referring to the drawings, the machine comprises the saw and clamp station 10, the feed table 11 and the delivery table 12.

The saw and clamp station 10 has a box-like housing with a rear wall 13, end walls 14, 15 and a top deck 16. The saw assembly consists in the platform 17 pivotally mounted between the end walls 14, 15 by means of trunnions 18, 19, the motor M shown as having its axis on the axis of the trunnions, the disc saw 20 carried by a drive shaft 21 which is journaled in posts 22, and the belt drive 23 connecting the motor drive shaft to the saw drive shaft. The saw is moved into and out of cutting position by means of the hydraulic or pneumatic cylinder 25, the piston of which is connected to the platform 17 at a point 26 spaced somewhat from the plane of the saw blade and corresponding approximately to the center of gravity of the saw assembly during a cutting operation. The deck 16 is provided with a slot 27 through which the saw blade can be projected to cut a log resting on the deck.

The clamp assembly includes the L-shaped clamp 30 having a vertical post portion 31 which is slidable in the guide 32, the latter being a tubular element welded to the deck adjacent the front end of the slot 27. The horizontal arm portion 33 of the clamp is downwardly open channel, wide enough and deep enough to permit the saw to complete its upward cutting movement as indicated by the broken lines in FIG. 3 while the lower edges of the channel rest against the workpiece W. A vertical guide in the form of a channel 35 is welded to the deck at the rear end of the slot 27 in a position to receive freely the end of the horizontal arm portion 33. Vertical movement of the clamp is effected by means of the air cylinder 36 which may conveniently be carried by the guide 32 with its piston 37 connected to the post portion 31 of the clamp by means of the boss 38.

It is assumed that the workpieces to be cut in this machine are logs W which have already been planed and grooved on two opposite sides so as to have a profile as shown most clearly by the broken lines in FIG. 4, and substantially uniform vertical thickness. The longitudinal grooves, particularly the lower one, are of great importance as reference lines for guiding the workpieces through all subsequent cutting and shaping operations.

The feed table 11 comprises suitably supported side rails 40 in which are journaled a plurality of rolls 41, 42. Some or all of the rolls 41 may be provided with sprockets 43 engaging a chain 44, to be positively driven by a motor, not shown. The roll 42, closest to the saw and clamp station, is provided with an annular ridge 45 adapted to fit in the bottom groove of a workpiece for precise alignment thereof. For the same purpose small wheels 46, 47 may be mounted on short posts on the underside of the deck 16 with their upper edges projecting through slots 48, 49 sufficiently to engage the bottom groove of the workpiece between the roll 42 and the saw.

The delivery table 12 also comprises suitably supported side rails 50 between which are journaled a series of rolls 51, each preferably provided with sprockets 53 engaging the chain 54 and driven by the motor 55 shown as being mounted on the end wall 15 of the housing. One or more fixed guide plates 55a can be mounted on plates 56 between the rails 50 in position to engage in the bottom groove of the log. A stop frame 60, comprising side rails 61 with suitably spaced double cross bars 62, is supported by legs 63 and bridges 64, in a position extending lengthwise of the delivery table and high enough to permit free passage of the workpiece transversing the table. Some or all of the cross bars 62 serve as sturdy supports for the log stops 70, each of which comprises a stop pin 71 in a brass bushing 72 and drivingly connected to the piston of a pneumatic cylinder 73. The cylinder is mounted on the upper element 74 of the double cross bar and the bushing is mounted in the corresponding lower element 75, both cross bar elements being firmly but adjustably secured to the rails 61 by bolts 76, as shown in FIG. 4. The rails are there shown as oppositely facing channels which are frictionally gripped by the ends of the cross bar elements. The stops are supported at a height such that, when retracted upward, they do not intersect the path of the logs (full lines in FIG. 4) but when dropped to the lower (broken line) position, they positively prevent advancement of the log.

The distribution of the log stops is predetermined by the requirements for cutting logs in certain standard lengths. Thus, the first stop may be 48" from the saw, with stops at 6" intervals for the next five feet, then at one foot intervals for five feet with one or more stops more remotely located, say, at twelve and sixteen feet. Each stop, as well as the saw drive, the saw platform cylinder and the clamp cylinder, is actuated independently by controls of a conventional nature mounted on a console, not shown, for actuation by an operator.

In operation, one or more log handlers will place a grooved log W on the feed table with its bottom groove fitted over the ridge 45 on roll 42, hand guiding the log, if necessary, to see that the groove is engaged also by the wheels 46, 47. The operator is informed, as by a job sheet or log marking, as to the length desired for the cut log and actuates the appropriate stop, dropping it to log arresting position. When the log end hits the stop the roll drive motors are stopped, the clamp cylinder is actuated to hold the log tightly against the deck above the saw, the saw motor is turned on and the saw platform cylinder is actuated to lift the saw into and through its cutting position. When the cutting is complete the series of operations is reversed and the cut piece is carried along to the end of the delivery table for such further processing as may be needed. If the severed tail portion of the log is long enough to be cut to a useful size the operation is repeated, otherwise the tail portion is discarded and another full length log is placed on the feed table.

The provision of automatic mechanical stops at predetermined positions makes it possible to cut rapidly a large number of logs, each with complete precision which could not be achieved by hand measurement and visual location of the cut line.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

We claim:

1. A cut-off saw assembly for cutting longitudinally grooved logs to selected predetermined lengths comprising a saw and clamp station, a feed table, a delivery table, and a stop assembly, the saw and clamp station having
   a power driven saw,
   a vertically movable support for the saw,
   means for moving the saw upward across the path of a workpiece,
   a vertically movable clamp, and
   means for moving the clamp into engagement with the top of a workpiece,
   the feed table having a plurality of rolls and guide means engageable with the longitudinal groove in a workpiece,
   the delivery table having a plurality of rolls and guide means engageable with the longitudinal groove in a workpiece, and
   the stop assembly being associated with the delivery table and having means for supporting stop devices at selected points above the path of the workpiece and along the length of the delivery table, a plurality of stop devices mounted on said
   supporting means and means for actuating selectively any one stop device.

2. In a cut-off saw assembly for cutting logs to selected predetermined lengths, power driven rolls for conveying a log endwise along a linear path, a power driven saw movable vertically into and out of the path of the logs, and a stop assembly comprising an elongated frame extending above and parallel to said path, a plurality of stop devices mounted on said frame at selected distances from the saw and means for actuating selectively any one stop device.

3. In an assembly according to claim 2, stop devices each consisting in a vertically movable stop pin and a fluid-actuated cylinder and piston connected to the stop pin and adapted to move the pin into and out of the path of the logs.

4. In an assembly according to claim 4, a stop assembly frame comprising double cross bars having upper and lower elements, each cylinder being mounted in an upper cross bar element and each corresponding stop pin being slidable in a bushing mounted on the lower cross bar element.

5. In an assembly according to claim 4, means for effecting adjustment of the double cross bars longitudinally of the stop assembly frame.

* * * * *